United States Patent
Rein de Vlugt

[11] Patent Number: 5,836,599
[45] Date of Patent: Nov. 17, 1998

[54] INDEPENDENT SUSPENSION APPARATUS FOR A WHEELED VEHICLE

[75] Inventor: Alexander Rein de Vlugt, Commerce Township, Mich.

[73] Assignee: Ford Global Technologies, Inc., Dearborn, Mich.

[21] Appl. No.: 787,508

[22] Filed: Jan. 21, 1997

[51] Int. Cl.⁶ .................................................. B60G 7/00
[52] U.S. Cl. .......................... 280/124.128; 280/124.116
[58] Field of Search ............................. 280/690, 95.1, 280/673, 93, 124.128, 124.153, 124.116

[56] References Cited

U.S. PATENT DOCUMENTS

| | | | |
|---|---|---|---|
| 3,892,284 | 7/1975 | Braess et al. | 280/690 |
| 4,029,338 | 6/1977 | Headley . | |
| 4,466,635 | 8/1984 | Okada et al. | 280/690 |
| 4,544,180 | 10/1985 | Maru et al. . | |
| 4,615,539 | 10/1986 | Pierce . | |
| 4,623,162 | 11/1986 | Weitzenhof et al. . | |
| 4,714,270 | 12/1987 | Rumpel | 280/690 |
| 4,725,073 | 2/1988 | Sano et al. . | |
| 4,758,018 | 7/1988 | Takizawa et al. | 280/690 |
| 4,798,396 | 1/1989 | Minakawa | 280/673 |
| 4,842,295 | 6/1989 | Hawkins | 280/690 |
| 4,858,949 | 8/1989 | Wallace et al. . | |
| 4,989,894 | 2/1991 | Winsor et al. | 280/690 |
| 4,995,636 | 2/1991 | Hall et al. . | |
| 5,150,918 | 9/1992 | Heitzmann . | |
| 5,156,646 | 10/1992 | Alesso et al. | 280/673 |
| 5,538,274 | 7/1996 | Schmitz et al. | 280/673 |

*Primary Examiner*—Charles T. Jordan
*Assistant Examiner*—Theresa M. Wesson
*Attorney, Agent, or Firm*—Gregory P. Brown

[57] ABSTRACT

An rear suspension apparatus suitable for use in a motor vehicle capable of decoupling longitudinal and lateral compliance is described. The suspension includes a control arm (18) having a rearward end (19) for supporting a rotatable wheel and tire assembly (16). The control arm (18) also includes inboard and outboard ends (20, 22) extending forwardly from the rearward end (19). The rear suspension also includes lower joints (24, 26) attached to the inboard and outboard ends (20, 22) of the control arm (18) for allowing the control arm to pivot relative to the lower joints. A pair of upper joints (34, 36) provide attachment to the vehicle structure (10). A linking device (42) is disposed between the lower and upper joints, whereby the control arm transfers loads through the lower joint means into the link, which transfers the load into the upper joint and into the vehicle structure.

15 Claims, 3 Drawing Sheets

INDEPENDENT SUSPENSION APPARATUS FOR A WHEELED VEHICLE

BACKGROUND OF THE INVENTION

1. Field of the Invention

This invention relates generally to an independent suspension for use on a motor vehicle. More particularly, the present invention relates to an independent suspension of the semi-trailing arm type utilizing a plurality of pivotable joints and a shackle therebetween to decouple a longitudinal and lateral compliance between a wheel support member and a motor vehicle structure to provide improved wheel alignment under dynamic loading.

2. Disclosure Information

Independent suspensions using semi-trailing arms are well known in the motor vehicle industry. The design is desirable for its simplicity, cost efficiency, and reasonable ability to maintain a tire and wheel assembly in a predetermined alignment with a road surface. One parameters used to measure this alignment is "toe". Toe refers to the orientation of the wheel and tire assembly about a vertical axis. "Toe-in" refers to a condition where the leading edge of the tire and wheel assembly has rotated, or turned, inward toward the center of the vehicle. As a suspension undergoes dynamic loading, it is desirable to manage toe-change to improve the dynamic response of the vehicle.

The major source of toe-change during dynamic loading occurs due to deformation of the elastomeric bushings used to mount the control arm to the vehicle structure. For personal use vehicles, customers expect plush, quiet suspensions. The elastomeric bushings common in today's suspensions are necessary to provide isolation from the dynamic loads imparted on the suspension during operation. Typically, when the vehicle encounters braking acceleration, bumps, chuckholes etc., the suspension attachment joints must deflect to provide adequate isolation, thus ensuring customer satisfaction. However, suspension designers cannot simply provide large amounts of deflection for isolation, as this could possibly compromise the handling performance of the vehicle. Thus, a compromise must be made between the isolation provided and the desired handling performance, to the extent soft elastomeric bushings impair optimal handling performance.

It would be therefore be desirable to provide a suspension design capable of decoupling isolation from handling performance such that a suspension could be designed that provided both optimal handling performance as well as sufficient isolation to satisfy customers.

SUMMARY OF THE INVENTION

According to the present invention, a rear suspension apparatus for a motor is provided for decoupling the lateral and longitudinal compliance of the attachment of the suspension to a vehicle structure. The rear suspension apparatus comprises a control arm having a rearward end for supporting a rotatable wheel and tire assembly. The control arm also includes inboard and outboard ends extending forwardly from the rearward end. The rear suspension also includes lower joints attached to the inboard and outboard ends of the control arm for allowing the control arm to pivot relative to the lower joint.

A pair of upper joints provide attachment to the vehicle structure. A linking device is disposed between the lower and upper joints, whereby the control arm transfers loads through the lower joint means into the link, which transfers the load into the upper joint into the vehicle structure.

An advantage of this rear suspension apparatus is to decouple the longitudinal and lateral compliance between the wheel support member and the vehicle suspension, thereby allowing suspension designers to provide for appropriate isolation while providing sufficient lateral load path stiffness to minimize or eliminate undesirable wheel and tire alignment changes due to compliance of the suspension joints under dynamic loading.

DETAILED DESCRIPTION OF THE PREFERRED EMBODIMENT

Figure 1:
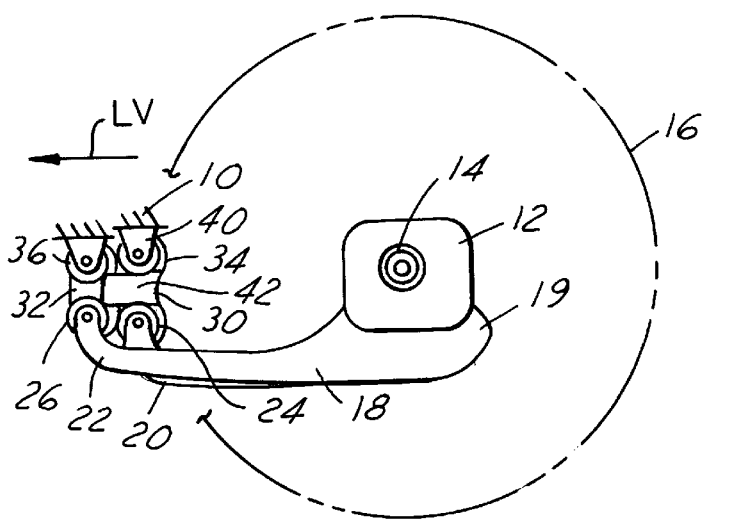
FIG. 1 is an side view of a rear suspension apparatus for use in a motor vehicle in accordance with the present invention.
Figure 2:
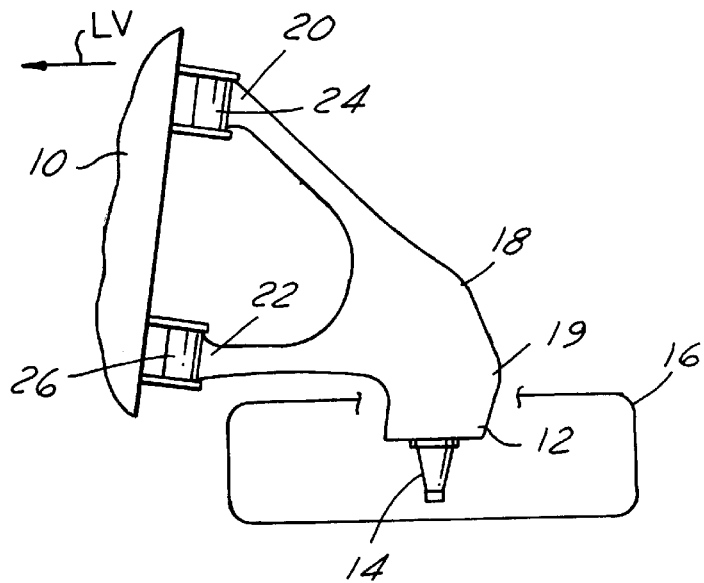
FIG. 2 is a plan view of a rear suspension apparatus according to the present invention.
Figure 3:
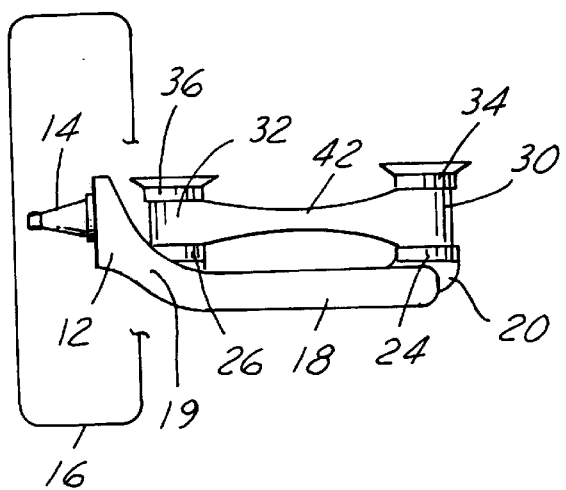
FIG. 3 is a rear view of a rear suspension apparatus according to the present invention.

Referring now to FIGS. 1–3, a suspension for a motor vehicle is shown attached to a subframe, which is a component of the vehicle structure 10. The term "structure" when used in this specification and claims will be understood to refer to either a conventional vehicle chassis having body on frame construction or a conventional unitary chassis and body construction, which may or may not incorporate subframes therein. In any event, the structure makes up a part of the sprung mass of the vehicle and provides a foundation for suspension attachment.

The suspension comprises a wheel support member 12 having a spindle 14 thereon for rotatably supporting a tire and wheel assembly 16. An driven axle (not shown) may be used in place of the freewheeling spindle 14 illustrated. A control arm 18, generally of the semi-trailing type, connects the wheel support member 12 to the vehicle structure 10. In the preferred embodiment, the rearward end 19 of the control arm 18 is rigidly connected to the wheel support member 12. Threaded fasteners or weldments may provide this connection, or in the case of a cast control arm 18, the assembly may be simplified by machining the wheel support member 12 from an extension of the control arm casting. It should be noted that only the left of the suspension will be described herein for purposes of simplicity, it being understood that the right side is simply the symmetric opposite of the left.

The control arm 18 includes inboard and outboard ends 20, 22 disposed forwardly alongitudinal axis (LV) from the rearward end (19) for pivotably attaching to lower inner and outer joints 24, 26. In the preferred embodiment, the inboard and outboard ends are bifurcated into flanged portions having apertures therein to receive a threaded fastener therethrough for securement to the joints. Although the inboard end of the installed control arm is shown installed slightly rearward of the outboard end relative to a longitudinal axis (LV) of the motor vehicle, this is not required to achieve the benefit of the present invention.

Figure 4:
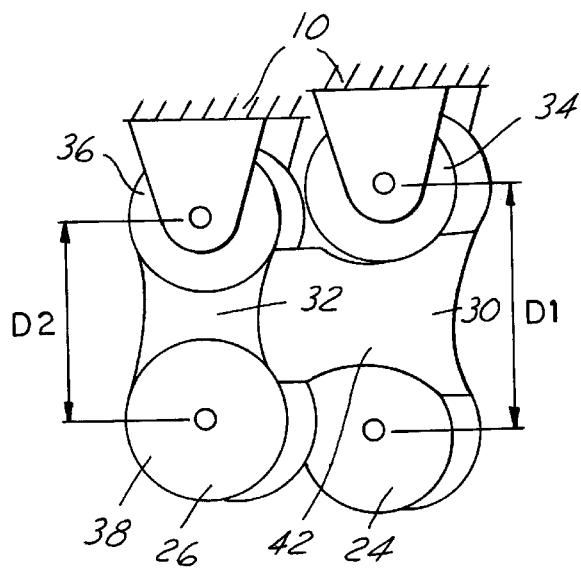
FIG. 4 is a side view of a pair of shackles and an interconnecting link member for maintaining a plurality of joints in predetermined spaced relationship in a rear suspension apparatus according to the present invention.

Referring now to FIG. 4, inner and outer shackles 30, 32 link the lower inner and outer joints 24, 26 to upper inner and outer joints 34, 36. Bifurcated mounting brackets 40 extend from the vehicle structure 10 and include apertures therein to receive threaded fasteners therethrough for pivotably securing the upper inner and outer joints 34, 36 to the vehicle structure. The shackles include bores 38 for receiving respective joints therein. In the preferred embodiment, the inner and outer shackles 30, 32 are interconnected by a torsionally rigid link member 42.

Figure 5:
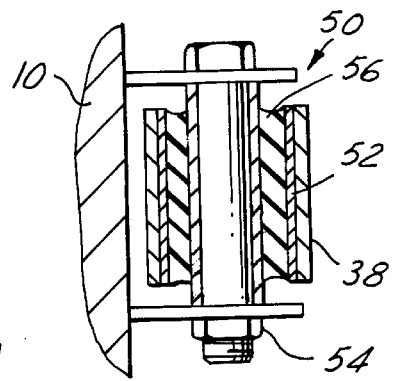
FIG. 5 is a partial sectional view of an elastomeric joint for use in a rear suspension apparatus according to the present invention.

Referring to FIG. 5, a conventional elastomeric bushing 50 which may be used for joints 24, 26, 34, 36 is illustrated. The elastomeric bushing 50 includes an outer sleeve 52 having an outer diameter permitting a press fit relationship within the bores 38 of the shackles. An inner sleeve 54 is coaxially disposed within the outer sleeve 52 forming an annular region therebetween which is contains a predetermined volume of an elastomeric material 56 having a predetermined durometer. The axis of rotation for any of the bushings described is determined by the orientation of the joint combined with its stiffness. As an example, an extremely stiff bushing would have an axis of rotation substantially coincident with its axis of orientation and a very compliant bushing would have a range of rotation rather than a single axis of rotation.

Figure 6:
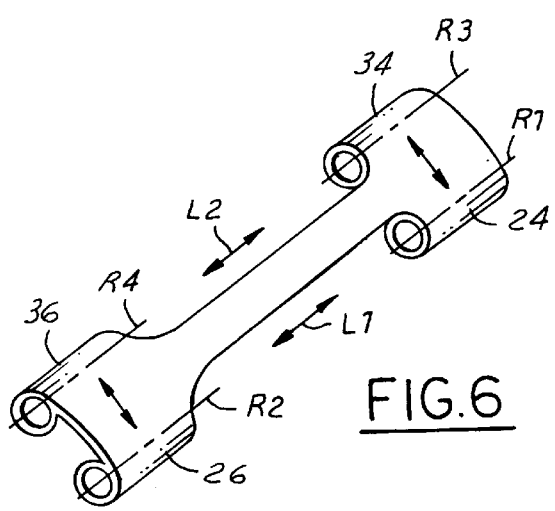
FIG. 6 is a perspective view of one embodiment of a pair of shackles and an interconnecting link member for maintaining a plurality of joints in predetermined spaced relationship in a rear suspension apparatus according to the present invention.

Referring now to FIGS. 6, the orientation of the joints will now be described. The lower inner joint 24 defines a first axis (R1) of orientation lying on a first predetermined axis (L1). The lower outer joint 26 defines a second axis of orientation (R2) also lying on the first predetermined axis (L1). The first predetermined axis extends forwardly, outwardly and upwardly from the lower inner joint 24 toward the lower outer joint 26 with respect to the longitudinal axis (LV) of the vehicle.

Similarly, the upper inner joint 34 defines a third axis (R3) of orientation lying on a second predetermined axis (L2). The upper outer joint 36 defines a fourth axis of orientation (R4) also lying on the second predetermined axis (L2). The second predetermined axis extends forwardly, outwardly and downwardly from the upper inner joint 34 toward the upper outer joint 36 with respect to the longitudinal axis (LV) of the vehicle.

Observations indicate that the four joints 24, 26, 34, 36 should be positioned out of plane. Under lateral loads, opposing vertical forces are generated at the inner and outer joints. Positioning the joints out of plane generates a torque in the shackle which generates a desirable elasto-kinematic toe-change to improve vehicle dynamics under lateral loading. It should be readily apparent to those skilled in the art that the first and second predetermined axes may be oriented to provide any desired roll center. For instance, the first predetermined axis could extend forwardly, outwardly and downwardly and the second predetermined axis could extend forwardly, outwardly and downwardly.

It has also been observed that it may be beneficial to skew the axes of orientation of the upper joints about their vertical axis in varying degrees to achieve further reductions in lateral compliance. Generally, with the axes of the upper joints skewed, a pole of motion exists at the intersection of the third and fourth predetermined axes (L3, L4) which may be positioned to further improve the alignment characteristics under varying suspension load conditions.

Figure 7:
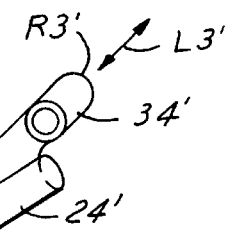
FIG. 7 is perspective view of an alternative embodiment of a pair of shackles and an interconnecting link member for maintaining a plurality of joints in predetermined spaced relationship in a rear suspension apparatus according to the present invention.

Referring to FIG. 7, an alternative orientation of the joints will now be described. As an alternative for providing reductions in lateral compliance, the third axis of orientation (R3') of the upper inner joint 34' may lie on a third predetermined axis (L3') and the fourth axis of orientation (R4') of the upper outer joint 36' may lie on a fourth predetermined axis (L4'). In the embodiment illustrated, (L3') and (L4') are substantially parallel to the vertical axis of the vehicle. Additionally, further advantage has been found by locating the lower outer joint 26' forward of the upper outer joint 36' and the lower inner joint 24' rearward of the upper inner joint 34' when viewed in the plan view with the vehicle at design ride height.

Additionally, observations indicate that the four joints 24', 26', 34', 36' should not be positioned in a common plane. Under lateral loads, opposing vertical forces are generated at the inner and outer joints. Positioning the joints out of plane generates a torque in the shackle which in turn generates a desirable elasto-kinematic toe-change. This can be tuned to improve vehicle dynamics under lateral loading.

The above described novel suspension geometry provides several operating advantages for increased vehicle stability, however, perhaps its greatest advantage lies in its ability to decouple longitudinal and lateral compliances for a trailing arm type suspension. Decoupling these compliances allows suspension designers to obtain desirable NVH performance by providing sufficient longitudinal compliance to absorb road noise while providing high enough lateral stiffness to yield desirable alignment for handling functionality.

Figure 8:
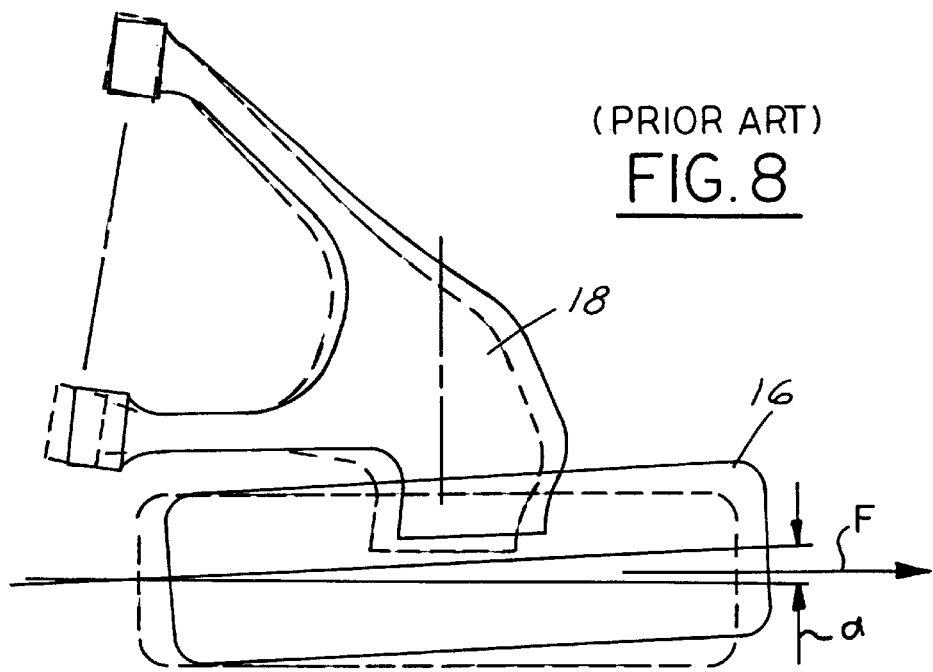
FIG. 8 is a plan view of a prior art a rear suspension illustrating its deflection when subjected to a braking force.
Figure 9:
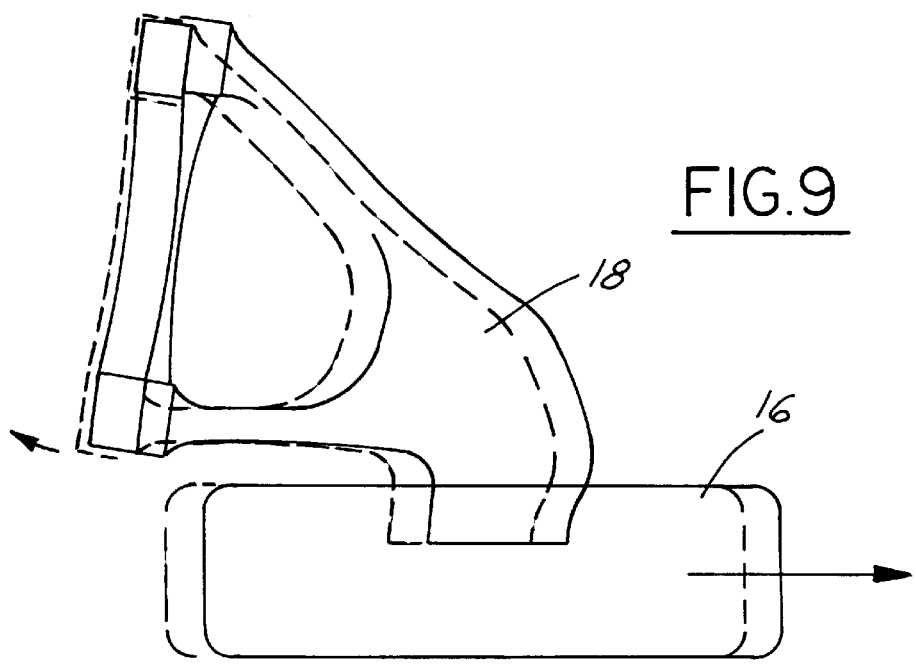
FIG. 9 is a plan view of a rear suspension illustrating its deflection when subjected to a braking force according to the present invention.

Referring now to FIGS. 8 and 9, one example of how the present invention improves over the prior art will be discussed. FIG. 8 illustrates the displacement of a conventional semi-trailing arm suspension when subjected to a braking force, F. The geometric relationship of the wheel support member relative to the attachment points of the control arm to the vehicle structure causes the suspension to rotate, which results in a toe-change in the toe-out direction, shown as α. Previously, to reduce this adverse toe-change, the suspension bushings had to be stiffened, comprising ride quality.

Referring now to FIG. 9, one advantage of the present invention over the prior art is illustrated. Subjecting the present invention to a brake force does not induce the aforementioned toe-out. Rather, the elastically generated toe-out of the control arm is countered by an elasto-kinematically generated toe-in, resulting from the vertical distances D1, and D2, as shown in FIG. 4. With D1 and D2 having different lengths, an equal rotation of the shackle generates different longitudinal displacement of the control arm connection points, respectively, thus generating a certain toe-change. Referring back now to FIG. 9, generally, it has been determined that keeping the first predetermined distance greater than the second predetermined distance will offset or substantially eliminate, as shown, the toe-change induced by the brake force, F'.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A rear suspension apparatus for a motor vehicle having a longitudinal axis (LV) and a vehicle structure, said rear suspension apparatus comprising:

a control arm having a rearward end for supporting a rotatable wheel and tire assembly, and inboard and outboard ends disposed forwardly alone the longitudinal axis (LV) from said rearward end;

lower joint means to for pivotally attaching said inboard and outboard ends of said control arm;

upper joint means for pivotally attaching to said vehicle structure; and link means for pivotally interconnecting said lower and upper joint means, whereby said control arm transfers loads through said lower joint means into said link means and from said link means into said upper joint means to the vehicle structure.

2. A rear suspension apparatus according to claim 1, further comprises:

a lower inner joint joining said inboard end of said control arm to said link means;

a lower outer joint joining said outboard end of said control arm to said link means;

an upper inner joint joining said link means to the vehicle structure; and an upper outer joint joining said link means to the vehicle structure.

3. A rear suspension apparatus according to claim 2, wherein each of said joints comprise an elastomeric bushing having an outer sleeve and an inner sleeve disposed coaxially within said outer sleeve and forming therebetween an annular region containing an elastomeric material.

4. A rear suspension apparatus according to claim 2, wherein said link means comprises an inner shackle interconnecting said lower inner joint to said upper inner joint and an outer shackle interconnecting said lower outer joint and said upper outer joint.

5. A rear suspension apparatus according to claim 4, wherein said inner shackle maintains said lower inner joint a first predetermined distance from said upper inner joint and said outer shackle maintains said lower outer joint a second predetermined distance from said upper outer joint, said first predetermined distance being greater than said second predetermined distance.

6. A rear suspension apparatus according to claim 4, wherein said link means further comprises a torsionally rigid link member extending between and interconnecting said inner shackle and said outer shackle, whereby said link member maintains a predetermined spaced relationship between said inner and outer shackles.

7. A rear suspension apparatus according to claim 2, wherein:

said lower inner joint includes a first axis of orientation coincident with a first predetermined axis;

said lower outer joint includes a second axis of orientation coincident with said first predetermined axis;

said upper inner joint includes a third axis of orientation coincident with a second predetermined axis; and said upper outer joint includes a fourth axis of orientation coincident with said second predetermined axis.

8. A rear suspension apparatus according to claim 2, wherein:

said upper inner joint includes a third axis of orientation coincident with a third predetermined axis; and said upper outer joint includes a fourth axis of orientation coincident with a fourth axis of orientation.

9. A rear suspension apparatus for a motor vehicle having a longitudinal axis (LV) and a vehicle structure, said rear suspension apparatus comprising:

a control arm having a rearward end for supporting a rotatable wheel and tire assembly, and inboard and outboard ends disposed forwardly alone the longitudinal axis (LV) from said rearward end;

lower inner and outer joints pivotally attached to said inboard and outboard ends of said control arm;

upper inner and outer joints pivotally attached to the vehicle structure; and link means for pivotally interconnecting said lower and upper joint means, whereby said control arm transfers loads through said lower joint means into said link means and from said link means into said upper joint means to the vehicle structure.

10. A rear suspension apparatus according to claim 9, wherein each of said joints comprise an elastomeric bushing having an outer sleeve and an inner sleeve disposed coaxially within said outer sleeve and forming therebetween an annular region containing an elastomeric material.

11. A rear suspension apparatus according to claim 9, wherein said link means comprises an inner shackle interconnecting said lower inner joint to said upper inner joint and an outer shackle interconnecting said lower outer joint and said upper outer joint.

12. A rear suspension apparatus according to claim 11, wherein said inner shackle maintains said lower inner joint a first predetermined distance from said upper inner joint and said outer shackle maintains said lower outer joint a second predetermined distance from said upper outer joint, said first predetermined distance being greater than said second predetermined distance.

13. A rear suspension apparatus according to claim 11, wherein said link means further comprises a torsionally rigid link member extending between and interconnecting said inner shackle and said outer shackle, whereby said link member maintains a predetermined spaced relationship between said inner and outer shackles.

14. A rear suspension apparatus according to claim 11, wherein:

said lower inner joint includes a first axis of orientation coincident with a first predetermined axis;

said lower outer joint includes a second axis of orientation coincident with said first predetermined axis;

said upper inner joint includes a third axis of orientation coincident with a second predetermined axis; and said upper outer joint includes a fourth axis of orientation coincident with said second predetermined axis.

15. A rear suspension apparatus according to claim 9, wherein:

said upper inner joint includes a third axis of orientation coincident with a third predetermined axis; and said upper outer joint includes a fourth axis orientation coincident with a fourth axis of orientation.

* * * * *